United States Patent [19]
Hale et al.

[11] Patent Number: 5,686,396
[45] Date of Patent: Nov. 11, 1997

[54] EFFICIENCY OF POLYGLYCEROL WITH OTHER ADDITIVES TO REMOVE WATER FROM SHALE

[75] Inventors: Arthur Herman Hale, Houston, Tex.; Eric van Oort, Rijswijk, Netherlands

[73] Assignee: Shell Oil Company, Houston, Tex.

[21] Appl. No.: 774,337

[22] Filed: Dec. 30, 1996

Related U.S. Application Data

[63] Continuation of Ser. No. 372,799, Dec. 23, 1994, abandoned.

[51] Int. Cl.$^6$ .................................................. C09K 7/02
[52] U.S. Cl. ............................................ 507/136; 507/139
[58] Field of Search ................................ 507/136, 139

[56] References Cited

U.S. PATENT DOCUMENTS

| | | | |
|---|---|---|---|
| 4,780,220 | 10/1988 | Peterson | 507/136 |
| 5,072,794 | 12/1991 | Hale et al. | 507/136 |
| 5,076,373 | 12/1991 | Hale et al. | 507/139 |
| 5,083,622 | 1/1992 | Hale et al. | 507/136 |
| 5,099,930 | 3/1992 | Enright et al. | 507/139 |
| 5,198,416 | 3/1993 | Hale et al. | 507/136 |
| 5,248,665 | 9/1993 | Hale et al. | 507/136 |
| 5,260,269 | 11/1993 | Hale et al. | 507/136 |
| 5,466,719 | 11/1995 | Jakobson et al. | 514/785 |

*Primary Examiner*—Philip Tucker
*Attorney, Agent, or Firm*—Fredrik Marlowe

[57] ABSTRACT

A composition and process for improving the osmotic efficiency of a shale during the drilling of a well with a drilling fluid containing polyglyerol with other additives.

2 Claims, 3 Drawing Sheets

○ PIERRE II WATER CONTENT = 2.1893 EXP(2.345*Aw)
△ PIERRE I WATER CONTENT = 1.6808 EXP(1.771*Aw)
□ PIERRE II EXPERIMENTAL WATER CONTENT
○ PIERRE I EXPERIMENTAL WATER CONTENT

◇ PIERRE II WATER CONTENT = 2.1893 EXP(2.345*Aw)
△ PIERRE I WATER CONTENT = 1.6808 EXP(1.771*Aw)
□ PIERRE II EXPERIMENTAL WATER CONTENT
○ PIERRE I EXPERIMENTAL WATER CONTENT

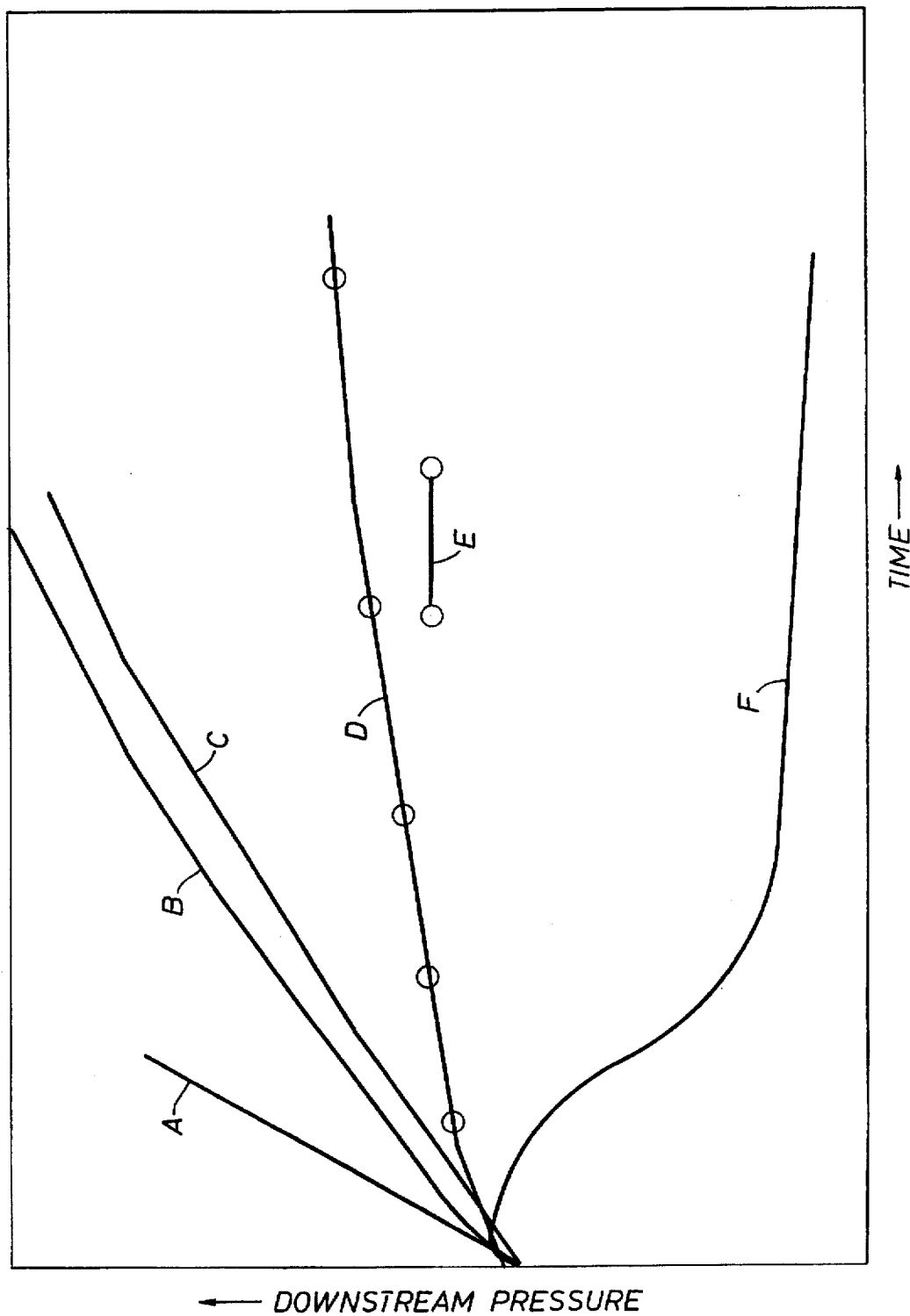

EFFICIENCY OF POLYGLYCEROL WITH OTHER ADDITIVES TO REMOVE WATER FROM SHALE

This is a continuation of application Ser. No. 08/372,799, filed Dec. 23, 1994 now abandoned.

BACKGROUND OF THE INVENTION

Borehole instability in shales is regarded as the prime technical problem area in oil and gas well drilling. It is one of the largest single sources of trouble-time associated with drilling, with cost estimates for the industry on the conservative order of magnitude of $500M/year. Shales are ill-defined, heterogeneous media ranging from weak clay-rich gumbos to highly cemented shaly siltstones, that have as a common denominator a low-permeability matrix that consists at least partially of clay minerals. Both mechanical and physico-chemical forces act on a downhole shale system. The former include the in-situ stresses, the pore-pressure and mechanical forces in the cementation that may develop in response to tensile or compressive loading. The physico-chemical forces in the clay parts of the shale system include the van der Waals forces and double-layer repulsion and, at small clay platelet distances, a variety of short range forces.

Shales fail if the effective state of stress overcomes the strength of the material. Drilling fluids may induce failure by changing the stress state and/or the material's strength. An obvious source of shale formation instability is the application of inappropriate mud weights. More complex are shale instability problems that derive from shale/drilling fluid communication and interactions. The main driving forces are hydraulic pressure and chemical potential gradients that transport water molecules and/or solutes between the drilling fluid and the shale, and thereby impact shale/pore fluid interaction, pore-pressure, and near-wellbore water content and cementation integrity. It is the nonideal nature of shale (that ill-defined heterogenous media that represents 50–60% by volume of the formation drilled) that prevents the optimization of drilling fluids such that the pore pressure within the rock matrix and the strength of rock matrix itself is controlled to prevent borehole instability problems.

The present invention seeks to provide drilling fluid additives which overcome the above described problems.

SUMMARY OF THE INVENTION

A process and composition are provided for improving the ability to remove water from shale during the drilling of a well comprising drilling the well with a drilling fluid comprising polyol with other additives.

DESCRIPTION OF THE DRAWINGS

FIG. 3 shows hypothetical efficiency examples.

DESCRIPTION OF PREFERRED EMBODIMENTS

Figure 1:
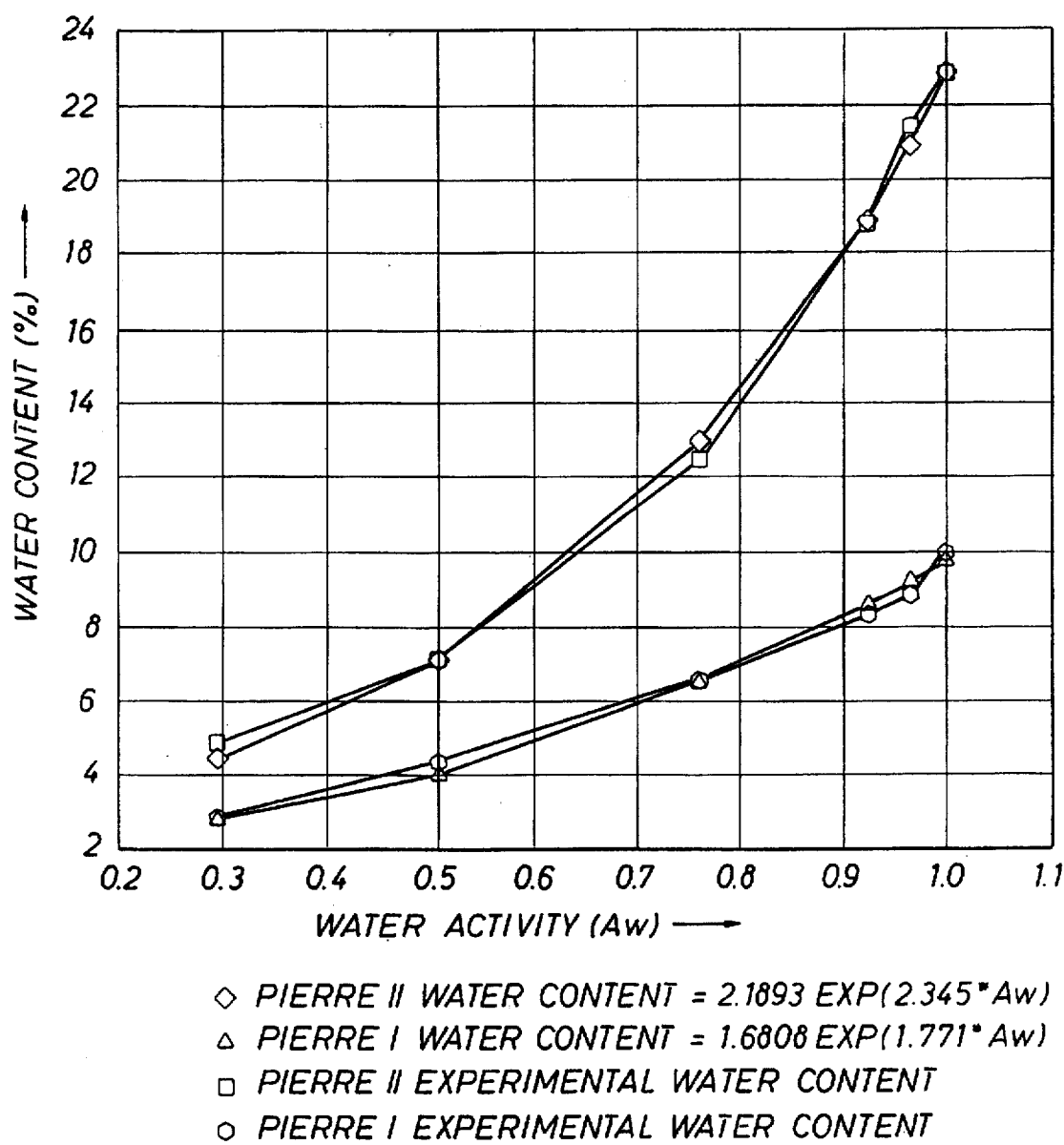
FIG. 1 is an adsorption isotherm.

The main criteria governing the viability of the mud systems of this invention are environmental acceptability and cost efficiency. Furthermore, the mud needs to be competent in areas other than shale stabilization (e.g., rheology, fluid loss, thermal stability, lubricity, etc.).

The minimal technical objective in the formation of shale drilling fluids is minimizing shale/drilling fluid communication, i.e., maintaining pressure isolation between wellbore and formation. This requires a restriction of fluid invasion in shales. The hydraulic flow, driven by water base mud over-balance, in both low- and high-permeability shales is reduced by an increase in fluid filtrate viscosity and/or a reduction of the effective permeability. Improved mud formulations thus may incorporate low-molecular-weight viscosifiers that impart high viscosity to the drilling fluid filtrate and/or agents that reduce the permeability of shales.

In addition, for low-permeability shales the hydraulic flow may be (temporarily) reduced or even reversed by osmotic backflow of formation pore fluid, induced by a chemical potential imbalance between mud and pore fluid. This may be accomplished using mud solutes that modify the water activity. Most efficient are solutes that give a low water activity relative to the shale (high osmotic pressures) and have limited mobility in a shale matrix (high reflection coefficient/osmotic efficiencies).

Direct flows in shales include the invasion of mud filtrate driven by hydraulic water base mud overbalance, and diffusion of (hydrated) solutes in- and out of the shale driven by chemical potential differences between the drilling fluid and the shale pore fluid. The possibility of coupled flows in shales (e.g., chemical osmosis=flow of water driven by chemical potential gradients) has been demonstrated in numerous studies on low-permeability, clay-rich media.

Non-equilibrium- or irreversible thermodynamics offers a convenient framework for the description of direct and coupled flow phenomena. In a phenomenological approach, a linear relationship between the flows $J_i$ and driving forces $X_i$ is assumed, i.e.:

$$J_i = \sum_{j=1}^{n} L_{ij} X_j, (i=1, 2 \ldots n) \tag{1}$$

The empirical coefficients $L_{ij}$, which are obtained from experiment, reflect the contribution of a certain gradient to a specific flow. Onsager's theorem states that the matrix of coefficients $L_{ij}$ is symmetrical, i.e., $L_{ij}=L_{ji}$. Expanding Eq. (1) for flow of a water base solution of a single non-electrolyte under the influence of the above-mentioned driving forces gives:

$$J_V = -L_{11} \nabla P - L_{12} \nabla \mu - L_{13} \nabla E - L_{14} \nabla T$$
$$J_D = -L_{21} \nabla P - L_{22} \nabla \mu - L_{23} \nabla E - L_{24} \nabla T$$
$$I = -L_{31} \nabla P - L_{32} \nabla \mu - L_{33} \nabla E - L_{34} \nabla T$$
$$J_Q = -L_{41} \nabla P - L_{42} \nabla \mu - L_{43} \nabla E - L_{44} \nabla T \tag{2}$$

where $J_V$, $J_D$, $I$ and $J_Q$ denote respectively the flow of total solution (total volume), the diffusive flow of solute relative to the volume flow, the flow of current and heat, and $\nabla P$, $\nabla \mu$, $\nabla E$ and $\nabla T$ denote respectively in hydraulic pressure, chemical potential, electrical potential and temperature.

The chemical potential of water $\mu_w$ for a non-ideal solution like a water base drilling fluid is given by:

$$\mu_w = \mu_w^\circ RT \ln a_w \tag{3}$$

where $\mu_w^\circ$ is the standard chemical potential of pure water, R is the gas constant, T is temperature and $a_w$ is the activity of water which can be obtained, e.g., from partial vapor pressure measurements.

Effects of temperature and electrical potential are ignored in the following. For the analysis, consider a discrete shale membrane system of thickness, $\Delta x$, separating a pore fluid reservoir and a drilling fluid reservoir (FIG. 1). The description of flows is restricted to $J_V$ and $J_D$, driven by differences in hydraulic pressure ($\Delta P = P^{DF} - P^{SH}$) and chemical potential ($\Delta \mu = \mu^{DR} - \mu^{SH}$). The direction of the flows is taken positive in the direction from the drilling fluid to the shale. For the flows per unit area, thus is obtained:

$$J_V = L_P \Delta P/\Delta x + L_{PD} \Delta \Pi/\Delta x$$

$$J_D = L_{DP} \Delta P/\Delta x + L_D \Delta \Pi/\Delta x \qquad (4)$$

Eq.(4) introduces the difference in osmotic pressure, $\Delta \Pi$, between the drilling fluid and the shale pore fluid, which for non-ideal solutions is defined in terms of water activities by:

$$\Delta \Pi = \frac{RT}{\bar{V}_w} \ln\left(\frac{a_w^{SH}}{a_w^{DF}}\right) \qquad (5)$$

where $\bar{V}_w$ represents the partial molar volume of water, and $a_w^{DF}$ and $a_w^{SH}$ denote the activity of the drilling fluid and the shale pore fluid respectively.

The diagonal coefficients in Eq. (4) are related to the transport coefficients found in uncoupled flows, e.g., $L_P$ relates to the hydraulic conductivity in Darcy's law and $L_D$ relates to the diffusion coefficient in Fick's first law. The off-diagonal- or cross-flow coefficient $L_{PD}$ reflects the efficiency of the process of osmosis. This efficiency is determined by the degree of rate-selectivity or perm-selectivity of the shale/fluid system, which alternatively may be expressed in terms of a "membrane reflection" coefficient $\sigma$, defined by:

$$\left(\frac{\Delta P}{\Delta \Pi}\right)_{J_v=0} = \frac{-L_{PD}}{L_p} = \frac{-(v_s - v_w)}{v_w} = \sigma \qquad (6)$$

or, $$\frac{v_s}{v_w} = 1 - \sigma \qquad (7)$$

where $v_s$ and $v_w$ are the velocities of the solute and water respectively. An ideal semi-permeable membrane system is characterized by $\sigma=1$, indicating $v_s=0$, i.e., all solute is "reflected" by the membrane and only water molecules can pass. With decreasing reflectivity/selectivity, i.e., $0<\sigma<1$, $v_s$ will increase and solute is transferred across the membrane. This system is usually referred to as a "leaky" membrane system. Finally, $\sigma=0$ represents a non-selective membrane system where solutes and solvent move at equal velocities ($v_s=v_w$) and no osmotic effects occur.

When characterizing membrane systems, the set of phenomenological constants $L_p$ and $\sigma$ is usually complemented by the solute permeability coefficient, $\omega$, which is defined as:

$$\frac{\omega}{\bar{C}_s} = \frac{L_p L_D - L_{PD}^2}{L_p} \qquad (8)$$

where $\bar{C}_s$ represents the average solute concentration in the membrane system. The solute permeability coefficient $\omega$ governs the rate of solute transfer across the membrane. For ideal semi-permeables, $\omega=0$, where for non-selective membranes in which the solute diffuses freely, $L_{PD}=0$ and $\omega = \bar{C}_s L_D$.

Eq. (4) can now be rewritten as:

$$J_V = L_p(\Delta P - \sigma \Delta \Pi)/\Delta x$$

$$J_D = -\sigma J_v + \frac{\omega}{\bar{C}_s} \Delta \Pi/\Delta x \qquad (9)$$

Eq.(9) shows that the volume flow $J_v$, driven by a pressure difference may be counterbalanced or enhanced by an osmotic pressure effected by a difference in chemical potential. The extent to which the osmotic pressure acts is scaled down by the reflection coefficient $\sigma$. Thus, for non-ideal membranes ($0<\sigma<1$) the extent of the osmotic pressure is less than predicted by Eq.(5). The transport of solutes across a non-ideal membrane system reduces and eventually equilibrates the initial chemical potential imbalance. As a result, the initial osmotic pressure is relaxed in time ($\Delta \Pi \rightarrow 0$), and flows will get essentially de-coupled, i.e., flow of total solution will be driven solely by the hydraulic pressure difference. Clearly, the driving force behind osmotic flow will act only temporarily for non-ideal systems. Osmotic phenomena in these systems are therefore of a transient nature.

Crucial to the use of osmotic flows for shale stabilization is the condition of the shale formation downhole. In formations with open fractures, osmotic flow will be strongly reduced, and concomitantly low-activity muds may not be very effective.

Another technical objective is design of water base drilling fluids with additives that would take advantage and optimize counterflows such as to increase the strength of the formation and improve the stress state around the wellbore. This objective is unique to the application and suggests interactions between the drilling fluid and shale can be beneficial.

For example, an effective technique combines reducing hydraulic flow directly through increased viscosity, as well as indirectly through induced osmotic backflows. For instance, high-concentration brines (low water activity solution) of, e.g., $CaCl_2$, $MgCl_2$, $NaCOOH$, and $KCOOH$ combine a high filtrate viscosity compared to water with a low activity.

However, other techniques are of value to limit the solute flow while enabling the solvent flow (water). The immediate benefits are the reduction of pore pressure to increase the mean effective stress and the increase in rock strength due to the reduced water content.

Because of the heterogenous nature of the shale rock matrix, prediction of what those techniques or methods are is not clear. Physical plugging and/or viscosity may enable a transient counter flow of pore water; however, this may not be the only mechanism by which the wellbore can be kept stable with time in a nonideal system (shale is a nonideal membrane) since the rate of equilibrium is highly dependent upon the hydraulic as well as osmotic permeability.

More unclear is whether, due to the unique interaction between shale and drilling fluid additive, an increase in the net flow of water could be observed beyond that predicted simply by ideality or chemical potential differences. Through mechanisms that at this point remain unclear, additives have been identified that increase the net amount of water removed over and above that expected, based upon chemical potential differences between the shale and the drilling fluid.

Exactly which materials in the drilling fluid will increase the ideality and/or increase the net flow and why are not clear. The chemical characteristics of reagents that can lower the water activity, adsorb "wet" the shale and interact with other reagents within the drilling fluid to increase the ideality and/or improve the net flow of water out of the shale are not manifest. It is doubtful that one given reagent will possess all the requirements to improve the osmotic character of shales.

Polyglycerols

In the present invention unique combinations of reagents, polyglycerols and other additives have been identified that enhance the ideality of the shale membrane and/or increase the net flow of water from the shale, thus increasing the time and degree of stabilization of the wellbore. The following U.S. patents relating to the preparation of polyglycerol are incorporated hereinto: U.S. Pat. No. 4,780,220 (Peterson); U.S. Pat. No. 3,637,774 (Babayan); U.S. Pat. No. 4,551,561 (Stuhler); U.S. Pat. No. 3,548,010 (Yoshino et al.); and U.S. Pat. No. 3,968,169 (Selden et al.). The concentration of polyglycerol in the water phase used to prepare the drilling fluid will generally be from 1 to 45% by volume, preferably 2 to 35% by volume, and most preferably 5 to 25% by volume. By stabilizing the wellbore better, the chance of drilling a wellbore with lower trouble costs (reduced stuck pipe from cavings, reduced washout, lower mud costs, etc.) and lower completion costs due to better primary cementing increases substantially. With better primary cementing due to improved mud displacement and thus improved zonal isolation, remedial cementing costs are reduced.

Polyethercyclicpolyols—(PECP)

These polyols have the formula:

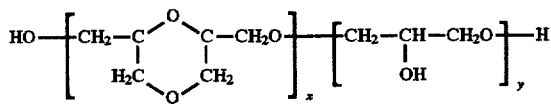

PECP have a ratio of x to y within the range of 5:2 to 1:10. A more complete description of PECP is in U.S. Pat. No. 5,058,679, the disclosure of which is incorporated herein by reference.

The concentration of PECP in the water phase used to prepare the drilling fluid will generally be from about 1 to 40% by volume, preferably 2 to 25% by volume, and more preferably 5 to 15% by volume.

Other Polyols

In combination with polyglycerols agents of the invention which improve osmotic efficiency of shale are water soluble polyalcohols having at least 2 carbon atoms and 2 hydroxyl groups but no more that 18 carbon atoms and 13 hydroxy groups. More preferably, the polyalcohols of the invention have at least 2 carbon atoms and 2 hydroxyl groups but no more than 9 carbon atoms and 7 hydroxyl groups. Glycerol is preferred for use with the invention. Also preferred are cyclic glycerol, propanediol, (1,2 propanediol or 1.3 propanediol), ethylene glycol, and ethoxylate/propoxylated glycol.

The concentration of polyol in the water phase used to prepare the drilling fluid will generally be from about 1 to 45% by volume, and more preferably from about 2 to 35% by volume; excellent results have been obtained with concentrations between about 5 to 25% by volume.

Glycosides

In combination with polyglycerols, glycosides, especially methyl glucoside, which incorporates saccharide-derived molecules with low mobility in solution, that viscosify the water phase and lower the water activity as well, are preferred for use with the invention. Glycosides are natural compounds of a sugar with another substance which hydrolyzes to its constituents: Glycosides yield glucose, fructosides yield fructose, galactosides yield galactose, etc. Glycosides are preferred in conjunction with soluble alcohol for use with the present invention. Glycosides are the ethers of monosaccharides, of which there are two types: alpha- and beta-.

The concentration of glycoside in the water phase used to prepare the drilling fluid will generally be from about 60 to about 2% by volume, and more preferably from about 50 to about 10% by volume; excellent results have been obtained with concentrations between about 40% by volume and about 20% by volume.

Drilling fluid in accordance with the invention can be formed through the use of conventional techniques and apparatus normally employed in well drilling operations. The polyglycerol and other additives may be added to the bulk drilling fluid prepared in a holding tank (mud pits) on the surface according to a procedure commonly referred to as batch mixing. However, the polyglycerol may be also injected continuously as needed into the drilling fluid as it is circulated from the pits through the mud pump down the drilling string through the bit and up the annulus back to the mud pit and pumped into the well by the use of an injection pump.

In the drilling of an oil or gas well, a drilling fluid is circulated to the bottom of a borehole and ejected into the borehole from a drill bit. Usually, the drilling fluid returns to the surface of the well through the annulus of the borehole. Alternatively, the drilling fluid rises to the surface from the bottom of the borehole through a drill stem. Various additives may be added to the drilling fluid at the surface to enhance its performance.

In order to perform the boring operation most effectively, the drilling fluid should possess a number of properties. Thus, the drilling fluid should be capable of suspending the solid particles from the drilling operation when the drilling fluid ceases to circulate in the borehole, transporting the cuttings resulting from the drilling operation out of the borehole, avoiding excessive amounts of fluid loss during drilling operations, cooling and lubricating the drill bit, providing a wall cake upon the borehole wall, and providing hydrostatic pressure to the borehole to prevent the borehole from caving in or blowing out while using drilling fluids in a high pressure environment.

Water base drilling fluids typically include water and several additives or dispersants such as viscosifiers, thinners, dissolved salts, and solids. The term "water base" is used to distinguish these drilling fluids from oil base drilling fluids and oil-in-water emulsion drilling fluids and means that no oil is intentionally added to the drilling fluid. In drilling short distances, water alone has been used as the drilling fluid, but it lacks the lifting power, lubricity and borehole supporting properties provided by conventional deep well additives. More frequently, solids-containing water base fluids with greater density, lifting power, and borehole supporting properties than water alone are employed as drilling fluids.

Many different additives and dispersants have been utilized that provide desired properties in drilling fluids. Exemplary are barium sulfate (barite), bentonite, low and medium yield clays, salt water clay, iron oxide, calcium carbonate, starch, carboxymethylcellulose, acrylonitrile, natural gum, molecularly dehydrated phosphate, tannin compound, quebracho, mined lignins, lignosulfonate, mica, sugar cane fibers, and granular materials. Bentonite is an especially common additive which gives the drilling fluid a thixotropic or gel structure; lignite is also a common additive which is added to the drilling fluid to control fluid loss; phosphate and lignosulfonate additives which deflocculate colloidal salts and thin the drilling fluid are also common.

As above mentioned, soft subterranean formations present the greatest problems for water base drilling fluids, especially formations of colloidal clays such as shales and gumbos, which tend to hydrate and swell when exposed to water base drilling fluids. Such swelling results in the formation of gummy, sludge-like paste in the borehole and reduces the cutting efficiency of the drill bit, thickens and impedes the circulation of drilling fluid, and plugs the drill. This is particularly true in drilling shales and related rock types where not only does the volume of the cuttings increase when hydrated, but the absorption water from the drilling fluid and dispersion of the shale increase both the viscosity of the circulated fluid and the torque demand on the drilling unit. Sometimes, enough torque can be exerted to cause the string to break or separate. Sometimes the viscosity increase results in fracturing the wellbore and lost circulation. Also, the shale and gumbo cuttings can stick to the surface of the drill bit and reduce its cutting efficiency by forming a layer between the bit and the formation being drilled. Further, the walls of the hole may collapse or become coated with hydrated cuttings, which makes it difficult to analyze the geologic structure penetrated, and the sludge of hydrated cuttings may stop the progress of a logging device or impede the operation thereof. Also, the collapse of the borehole wall may result in stuck pipe, poor circulation, poor cement and completion, and can result in excessive cost.

In spite of all of the above problems which are frequently encountered when softer formations are drilled with water base drilling fluids, such fluids are becoming increasingly attractive as compared to oil base drilling fluids. Generally, oil base drilling fluids are superior to water base drilling fluids by most measurements except one, environmental. Oil base drilling fluids are particularly difficult to dispose offshore, since such fluids cannot be dumped into the ocean, and it is in the offshore area that water base drilling muds are drawing the most interest.

Example I

In Table 1 the effectiveness of various solutions to remove water from shale is shown. Two shales were used in the test, Pierre I is a outcrop obtained in the U.S. that has an exchange capacity of 15–20 meq/100 gm with water content of 8–10% by volume and a total clay content of 25–35% by volume. Pierre II is an outcrop obtained in the U.S. that has an exchange capacity of 25–30 meq/100 gm with a water content of 18–24% by volume and a total clay content of 35–40% by volume.

Native shale was soaked for 16 hours at 150° F. under atmospheric conditions in the test solutions identified in Table 1. After 16 hours the shale was washed and cleaned in kerosene, wiped dry, weighed and then dried at 105° C. for 24 hours. The water content was calculated as (Wgt Wet–Wgt dried)/(Wgt dried)*100.

TABLE 1

Efficiency of Polyglycerol In Combination with Other Additives to Remove Water From Shale

| Solution | | Improvement Efficiency | | (%) | | Measured Predicted | | Pierre I | | Pierre II | |
|---|---|---|---|---|---|---|---|---|---|---|---|
| | | Pierre I | Pierre II | Pierre I | Pierre II | Solution (Aw) | Solution (Aw) | Efficiency Ratio | Predicated | Efficiency Ratio | Predicated |
| A Average Native | | | | 9.3 | 22.9 | — | | | | | |
| 21% NaCl solution | | | | 9.2 | 20.6 | 0.85 | | 0.82 | | 0.83 | |
| 30% polyglycerol | | | | 8.8 | 20.3 | 0.95 | | 1.03 | | 1.06 | |
| 30% polygycerol + | 21% NaCl solution | No | No | 7.6 | 17.9 | 0.77 | 0.80 | 0.86 | 0.85 | 0.81 | 0.89 |
| B Average Native | | | | 9.3 | 22.9 | — | | | | | |
| 20% Glycerol solution | | | | 9.1 | 22.7 | 0.94 | | 0.97 | | 0.92 | |
| 30% polyglycerol | | | | 8.8 | 20.3 | 0.95 | | 1.03 | | 1.06 | |
| 30% polygycerol + | 20% Glycerol | Yes | Yes | 7.4 | 16.0 | 0.86 | 0.89 | 1.05 | 1.00 | 1.11 | 0.98 |
| C Average Native | | | | 9.3 | 22.9 | — | | | | | |
| 20% Methyl Glucoside | | | | 9.1 | 22.0 | 0.96 | | 1.00 | | 0.98 | |
| 30% polyglycerol | | | | 8.8 | 20.3 | 0.95 | | 1.03 | | 1.06 | |
| 30% polygycerol + | 20% Methyl Glucoside | Yes | Yes | 7.7 | 17.3 | 0.90 | 0.907 | 1.07 | 1.03 | 1.12 | 1.04 |
| D Average Native | | | | 9.3 | 22.9 | — | | | | | |
| 20% Methyl Glucoside | | | | 9.1 | 22.0 | 0.96 | | 1.00 | | 0.98 | |
| 20% Polyglycerol | | | | 9.7 | 21.9 | 0.97 | | 0.96 | | 1.02 | |
| 20% Polyglycerol + | 20% Methyl Glucoside | Yes | Yes | 8.1 | 18.3 | 0.93 | 0.923 | 1.07 | 0.97 | 1.11 | 1.00 |
| E Average Native | | | | 9.3 | 22.9 | — | | | | | |
| 10% Methyl Glucoside | | | | 9.7 | 23.5 | 0.97 | | 0.96 | | 0.95 | |
| 10% Polyglycerol + | | | | 10.0 | 22.6 | 0.99 | | 0.97 | | 1.04 | |
| 10% Polyglycerol + | 10% Methyl Glucoside | Yes | No | 8.9 | 21.5 | 0.96 | 0.958 | 1.02 | 0.93 | 1.01 | 0.98 |
| F Average Native | | | | 9.3 | 22.9 | — | | | | | |
| 20% Polyglycerol | | | | 9.7 | 21.9 | 0.99 | | 1.00 | | 1.06 | |
| 20% Ethoxylate/Propoxylated Glycol | | | | 9.7 | 22.6 | 1.00 | | 1.02 | | 1.06 | |
| 20% Polyglycerol + | 20% Ethoxylate/Propoxylated Glycol | Yes | No | 8.50 | 19.05 | 0.96 | 0.96 | 1.07 | 1.01 | 1.14 | 1.12 |
| G Average Native | | | | 9.3 | 22.9 | | | | | | |
| 10% Polyglycerol | | | | 10.0 | 22.6 | 0.99 | | 0.97 | | 1.04 | |
| 20% PECP | | | | 9.8 | 23.6 | 1.00 | | 1.00 | | 1.01 | |
| 10% Polyglycerol + | 20% PECP | Yes | Yes | 8.4 | 20.0 | 0.98 | 0.99 | 1.13 | 0.97 | 1.14 | 1.05 |

TABLE 1-continued

Efficiency of Polyglycerol In Combination with Other Additives to Remove Water From Shale

| Solution | Improvement | | Efficiency (%) | | Measured Solution (Aw) | Predicted Solution (Aw) | Pierre I Efficiency Ratio | Pierre I Predicted | Pierre II Efficiency Ratio | Pierre II Predicted |
|---|---|---|---|---|---|---|---|---|---|---|
| | Pierre I | Pierre II | Pierre I | Pierre II | | | | | | |
| Average Native | | | 9.3 | 22.9 | | | | | | |
| 21% NaCl | | | 9.2 | 20.6 | 0.85 | | 0.82 | | 0.83 | |
| 20% Glycerol | | | 9.1 | 22.7 | 0.94 | | 0.97 | | 0.92 | |
| 21% NaCl + 20% Glycerol | No | No | 8.7 | 20.4 | 0.79 | 0.78 | 0.78 | 0.79 | 0.73 | 0.74 |

Efficiency is calculated as the inverse of the ratio between the experimental water content and the Native water minus water content predicted from the adsorption isotherm shown in FIG 1.
The predicted efficiency is 1 minus the sum of the difference, between 1 and experimental values for each individaul additive.
Shales were soaked in the test solution at 150 F. under atmospheric condition for 16 hours. The shales were washed, weighed and dried at 105 C. to determine water content. The water activity of the the test solutions were measured as described in American Petroleum Institute API Recommended Practice 13B-2(RP 13B-2) second addition December 1991.

In FIG. 1 the water content as a function of water activity is shown. This relationship was obtained by doing an adsorption isotherm. Native shale was incubated until equilibrium in desiccators above salt solutions which modifies the relative humidity of the chamber. Each salt within the solution at given temperature will give up water or adsorb water until equilibrium is attained. At equilibrium the partial vapor pressure of the water in the air above the salt solution will be a direct result of the tendency of the salt to adsorb water. In Table 2 the water activity resulting and thus the relative humidity of the air above the solution are shown.

TABLE 2

| Saturated Salt Solution | Water Activity (Aw) | Relative Humidity (%) |
|---|---|---|
| Calcium Chloride | 0.295 | 29.5 |
| Calcium Nitrate | 0.505 | 50.5 |
| Sodium Chloride | 0.753 | 75.3 |
| Potassium Nitrate | 0.938 | 93.8 |
| Sodium tartrate | 0.920 | 92.0 |
| Potassium Dihydrogen Phosphate | 0.960 | 96.0 |

As described in American Petroleum API Recommended Practices 13B-2 (RP 13B-2) Second Edition, Dec. 1, 1991.

Because the shale is not in direct content with the solution, the water content resulting from exposure to the vapor above the different water activity solutions at equilibrium represents the ideal osmotic efficiency. In the test solutions at a given water activity the effectiveness of a test solution to alter the native water content can be examined by calculating the ratio between the water content of the shale after exposure to the test solution, to the native water content plus the deviation between the native water content and the water content predicted at the same water activity by the adsorption isotherm. If the ratio is 1.0 then the water content of the experimental sample is as predicted by the water activity of the test solution. If the ratio is less than 1.0 the system was less efficient in dewatering the shale than predicted by the adsorption isotherm. If the ratio is greater than 1.0 then the shale lost more water than predicted by the adsorption isotherm.

The fact that the additive combination may be higher than 1.0 indicates the following: (a) high efficiency of removing water due to chemical potential differences, (b) adsorption and thus displacement of the pore water fluid by the additive, (c) increased rate of water removal from the shale due to concentration effects near the surface of the shale core and/or (d) a combination of all of the above.

The apparent increased rate may in part reflect the difference in the adsorption isotherm done at room temperature but for extended periods of time (weeks) and the fluid tests which were done at 150° F. but for 16 hours. Since the shale efficiency is expected to be in the presence of a hydraulic driving force much less than 1.0, the net result at equilibrium could be very small when performing fluid tests. However, if the rates are substantially altered, as suggested by the fluid tests without hydraulic pressure, such that water flows more rapidly relative to the water modifying component (alter water activity, alcohol, salts, etc.) then the relatively immediate term change in pore pressure could stabilize the wellbore, the relatively immediate term reduction in water content could strengthen the shale and thus stabilize the wellbore. The fact that strain of the shale under wellbore conditions can occur in both the positive and negative direction depending upon the stress state, the strength of the shale and the flow regime in or out of the shale, would suggest that with removal of water the efficiency of the shale might improve with time resulting in true net changes in pore pressure and water content at equilibrium. At this point it is not clear how the different additives result in the changes in water content as measured.

In Table 1 several solutions are shown. The mixtures of polyglycerol and glycerol (B&C), polyglycerol and methyl glucoside (D), polyglycerol and ethyoxylated/propoxylated glycol (*F) and polyglycerol and PECP (G) are more effective at dewatering shale than predicted. Glycerol does not remove wter as well as predicted based upon water activity (Efficiencyt ratio is <1.0). However, polyglycerol alone is more effective at reducing the water content of the shale based upon that predicted by the water activity (Efficiency ratio >1.0). The net combination of the two additives is significantly greater than predicted based upon a simple additive response of the individual components for both shales (Efficiency ratio of >1.0). These increases were significant (95% confidence level) deviations from the additive effects expected from the individual components.

Polyglycerol and polyglucoside, PECP or ethoxylated/propoxylated glycol are similar to the polyglycerol and glycerol combination. The combination of additives significantly reduced the water content of the shale over and above that predicted from the effectiveness of the individual components. The polyglycerol with methyglucoside, ethoxylated/propoxylated glycol or polyglyerol were especially effective.

Polyglycerol and NaCl(A) were not effective. NaCl is a poor dewatering agent and results in a significantly less than 1.0 efficiency ratio. The efficiency ratio of the combination of o\polyglycerol and NaCl is not better compared to what was predicted based upon an additive relationship. In fact it was lower when tested against Pierre II.

The fact that the water activities of the different solutions acted independently when combined is shown by the fact that measurement of the water activities of the combination test solution was essentially as predicted by adding the differences of the individual components from ideality. This result suggests that the differences observed in the extent of dewatering the shale are a direct result of the change in the efficiency of removing water from the shale and not simply a lowering of the water activity of the test solution.

The exact synergy between polyglycerol was also substantiated when tested with other test solutions on Pierre I and II (Table 1). The efficiency in the presence of the two additives in combination was simply greater than that expected by either singularly. Similar results were observed when polyglycerol was mixed with methylglycerol (Pierre I and II) and PECP, or ethoxylated/propoxylated glycol. However, the mixture of polyglycerol and sodium chloride was not effective at increasing the efficiency ratio nature of the shale.

If the ratio is less than one then that indicates that the shale is not acting as efficiently as predicted. The lack of hydraulic driving force enables the shale to act as an effective membrane (efficiency ratio of 1.0). However, even without a hydraulic force some of the test fluids invade the shale sufficiently to result in an efficiency ratio of less than 1.0. One of the opportunities is that the efficiency ratio can be improved by the addition of another additive. In the example shown in Table 1 polyglycerol in combination with NaCl does not serve that function. In fact it may make it worse as shown in the test solutions.

Figure 2:
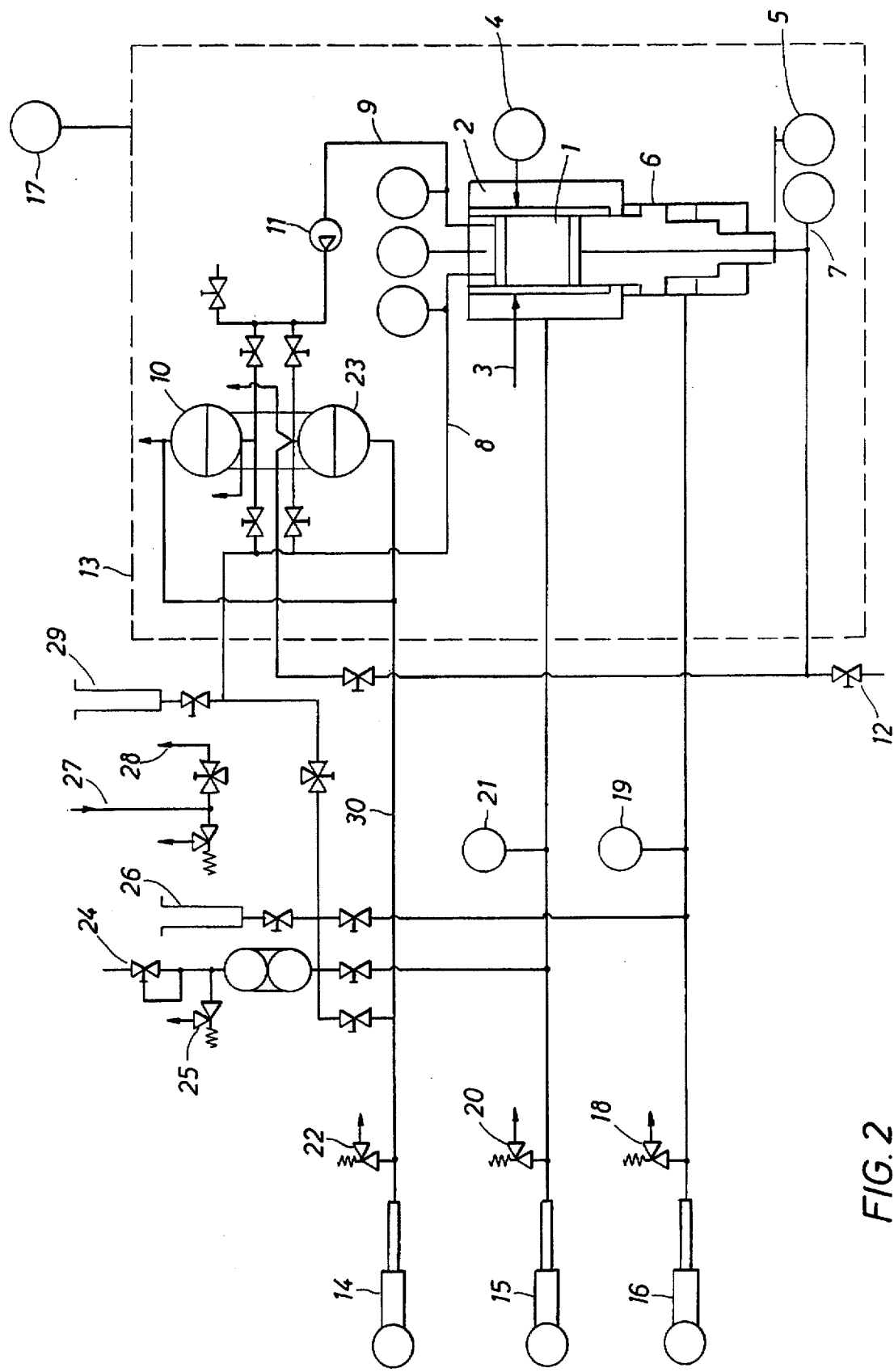
FIG. 2 is a schematic of equipment used for screening and analysis of rock samples.

When a hydraulic pressure differential is present a different set of date are possible. Because typically in drilling a hydraulic pressure differential exists this is the more realistic situation. In FIG. 2 the equipment used to test the improvement in removing water against a hydraulic pressure gradient is shown.

A schematic of type A equipment, used for in-depth drilling fluid screening and permeability analysis, is given in FIG. 2. The rock sample 1 (typically 2.5-5.0 cm in diameter and variable length) is placed between two porous frits 2 in a Viton sleeve 3 which transmits a radial confining stress 4. Axial confining stress 5 is applied through a piston 6. The sleeve 3 and piston 6 are loaded using hydraulic oil, pressurized by two servo-controlled pumps up to 50 MPa. The hollow interior of the piston is connected to the downstream reservoir 3, which is fitted with a pressure transducer. The coreholder has an upstream inlet 8 and outlet channel 9, each fitted with a pressure transducer, which are connected to the upstream reservoir. This reservoir incorporates two separate accumulators (for pore fluid and mud 10, respectively), an HTHP mud pump 11 for circulation of fluids over the top face of the shale, and a drainage outlet 12. Mud pressures are variable in the range 0-35 MPa. Corrosion-resistant material (Monel) with a temperature resistance up to 150° C. has been used for all parts in contact with mud. An oven 13 is used for optimal temperature control. Control over pumps 14-16 and readout of transducers and temperature sensors 17 is fully automated. Hydraulic oil is supplied from piston measure pump 16 at 7250 psi, relief valve 18 being set at a maximum of 7830 psi, past overburden sensor 19 to the vicinity of piston 6. Other hydraulic oil is supplied from sleeve pressure pump 15 at 7250 psi, relief valve 20 being set at 7830 psi max, past sleeve sensor 21 to the vicinity of sleeve 3. Finally, hydraulic oil is supplied from mud pressure pump 14 at 5075 psi, relief valve 22 being set at 5510 psi, to water/oil accumulator 23 connected to oil/mud accumulator 10. $N_2$ 24 is supplied at 2900 psi, post relief valve 25 at 3045 psi, and connected to the sleeve oil supply line. Oil container 26 is connected to the piston pressure line shop in 27 and vacuum are associated with mud/water vessel 29 which in turn is connected to well bore in line 8, and to mud pressure pump line 30. Operating time per test is typically several weeks.

FIG. 3 compares the efficiency of single components with the hypothetical efficiency of combined components for removal of water from shale. Thus, downstream pressure is shown increasing with time with respect to lines A-D and staying the same with line 3. Line F, on the other hand, shows dropping pressure for combined components. Line A is for water, line B for salt in water, line C for polyol in water, line D for 2.5 to 30% V/V in water of quaternary amine, fatty amine, ethoxy/propoxy ether glycols, amino acids, polyamines, esters, mono-di-tri-alkyl tertiary amines, polyglycol copolymers, and polyethylene glycol. Line E is for 2.5 to 45% by volume polyglycerol. Line F shows what is expected to happen when the components on lines D and E are combined.

What is claimed is:

1. A process for improving the osmotic efficiency of shale during the drilling of a well comprising drilling the well with a drilling fluid comprising polyglycerol and the product of glycols which have been ethoxylated and/or propoxylated, wherein the polyglycerol and the product of glycols are present in a ratio of about 1:1.

2. A drilling fluid for improving the osmotic efficiency of shale during the drilling of a well comprising polyglycerol and the product of glycols which have been ethoxylated and/or propoxylated, wherein the polyglycerol and the product of glycols are present in a ratio of about 1:1.

* * * * *